(No Model.)
C. BIZI.
CULTIVATOR.
No. 491,632. Patented Feb. 14, 1893.
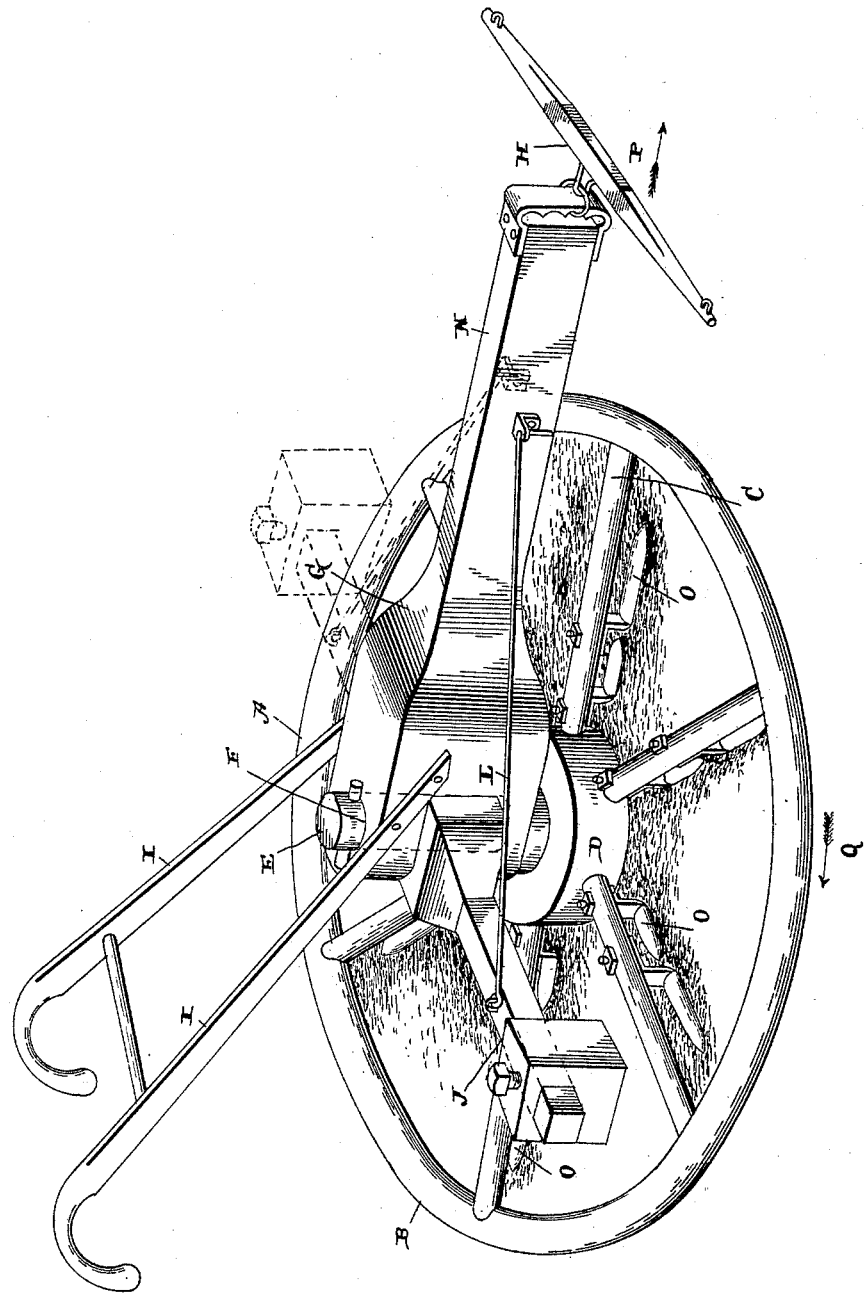
WITNESSES:
Geo. E. Frech.
Ralph Daskam.
INVENTOR
Charles Bizi
BY John Wedderburn
his ATTORNEY.

UNITED STATES PATENT OFFICE.

CHARLES BIZI, OF SELMA, CALIFORNIA.

CULTIVATOR.

SPECIFICATION forming part of Letters Patent No. 491,632, dated February 14, 1893.

Application filed July 16, 1892. Serial No. 440,268. (No model.)

*To all whom it may concern:*

Be it known that I, CHARLES BIZI, of Selma, in the county of Fresno and State of California, have invented certain new and useful Improvements in Cultivators; and I do hereby declare the following to be a full, clear, and exact description of the invention, such as will enable others skilled in the art to which it appertains to make and use the same.
My invention relates to an improved form of revolving cultivator, designed for greater simplicity of construction and efficiency of operation, and my invention more particularly resides in the novel combination, construction and arrangement of parts hereinafter fully specified and pointed out in the claims.

The accompanying drawing shows a perspective view of my improved cultivator.
A is a circular frame composed of the rim B, spokes C and hub D, the upper portion of said hub forming a shaft E which revolves in a bearing F in the Y-shaped frame G. To the forward end of the frame G is attached the whiffletree H, and from its hinder end project handles I similar in form to those on an ordinary plow.

On the shaft E and between the arms of the Y-shaped frame G is an arm J which is capable of swinging on the shaft E until it occupies a position on either side of the frame G and at right angles to it. The outer end of the arm J carries an adjustable weight K. The arm J is held in the required position by means of the detachable rod L which fits into one of the brackets M, N one on either side of the forward part of the frame G. To the spokes C, and extending downward, are secured harrow or cultivator teeth, or scrapers O.

The operation of my device is as follows: The operator guides the cultivator by means of the handle I as in the case of an ordinary plow. When the device is moved forward the weighted arm J bears that part of the wheel A which is immediately beneath it, downward, causing the teeth O on that side of the cultivator to sink deeper or take a firmer hold in the earth than the teeth on the opposite side, thereby revolving the wheel A in a direction indicated by the arrow Q. When the arm J is swung into the position indicated in the drawing by the dotted lines, the teeth on that side of the wheel A are caused to sink deeper in the earth and the cultivator wheel is revolved in the opposite direction. By means of my cultivator the ground is cultivated more evenly and rendered finer and more mellow than in the case of an ordinary cultivator, as the teeth disturb the ground both transversely and longitudinally. The depth which the teeth or blades O sink into the ground is regulated by adjusting the weight K on the arm J. The farther the weight K is placed away from the upright shaft E, the deeper the teeth on that side of the wheel A sink into the ground.

My invention is especially applicable to the cultivation of the soil about trees or vines, which are planted in rows. By changing the form of the teeth on the revolving wheel, my device may be used to cut or mow weeds or grass.

I do not restrict myself to any particular form of the revolving wheel which carries the teeth, as the rim may be entirely dispensed with. Any form of wheel may be used carrying downwardly projecting teeth or blades.

Having thus fully described my invention, what I claim and desire to secure by Letters Patent, is

1. In a cultivator, the combination of a shaft slightly inclined to the vertical, arms radiating from said shaft, said arms carrying cultivator teeth, and a secondary arm revolubly secured to said shaft and at right angles to it, and a weight secured to said revoluble arm, said weight being adapted to incline the shaft from the vertical, substantially as and for the purpose set forth.

2. In a cultivator, the combination of a draft-beam, a shaft rotating in one end thereof and slightly inclined to the vertical, arms radiating from said shaft and rotating therewith carrying cultivator teeth, an arm projecting from the shaft at right-angles to the draft-beam and secured thereto, a weight on the arm and means for securing the weight at any desired point upon the arm, substantially as described.

In testimony whereof I have signed this specification in the presence of two subscribing witnesses.

CHARLES BIZI.

Witnesses:
WICK B. PARSONS,
E. C. OSBORNE.